Figure 1:
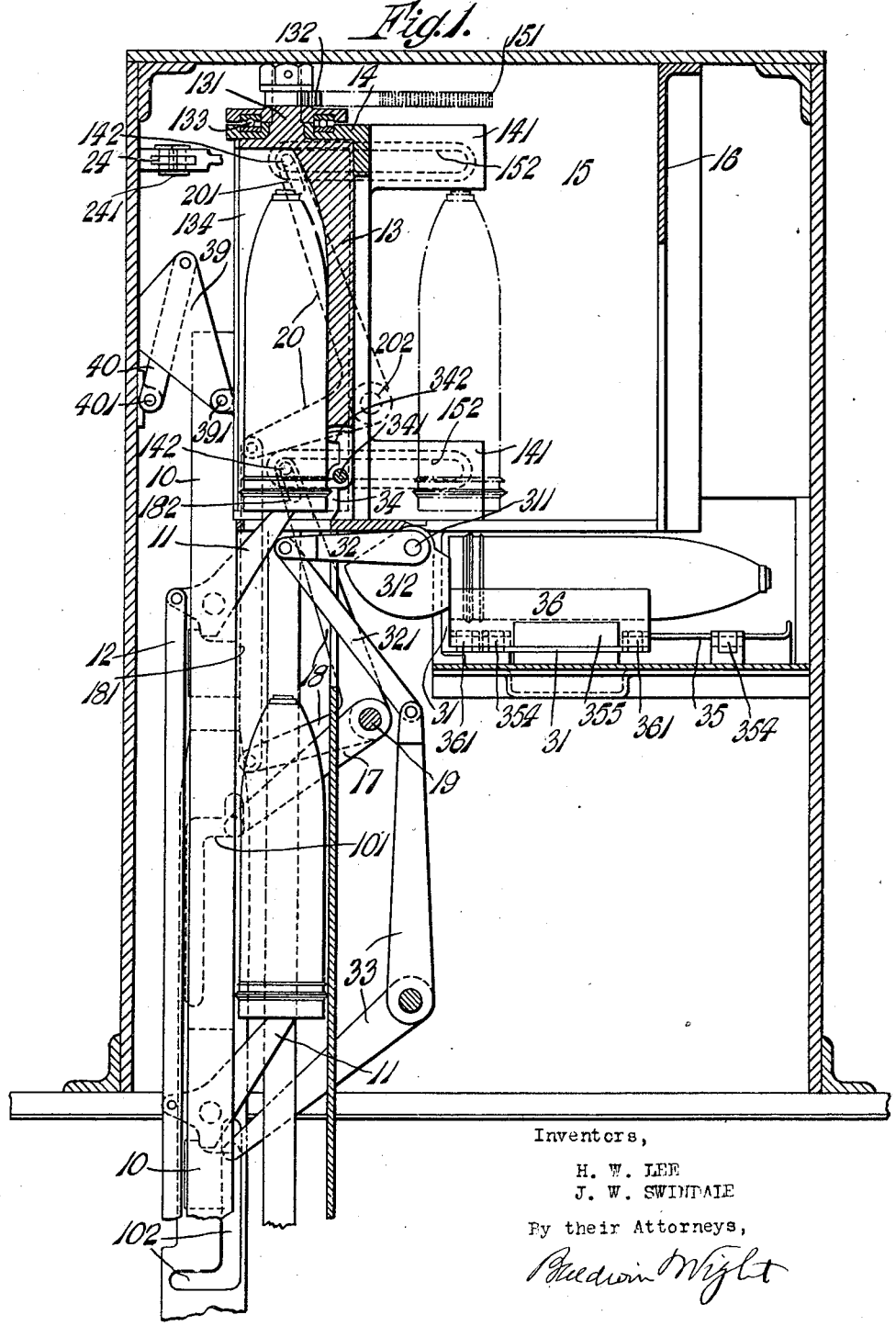

Aug. 28, 1923.

H. W. LEE ET AL 1,465,990

AMMUNITION HOIST ESPECIALLY SUITABLE FOR USE ON BOARD SHIP

Filed March 27, 1923   6 Sheets-Sheet 2

Inventors,
H. W. LEE
J. W. SWINDALE,
By their Attorneys

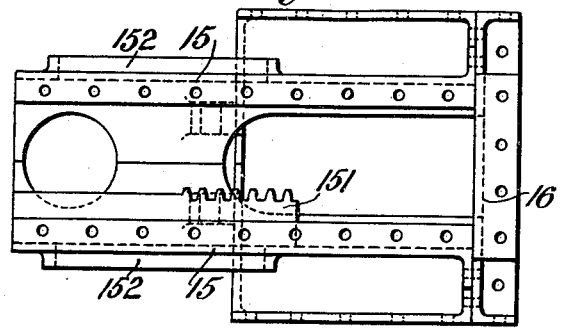
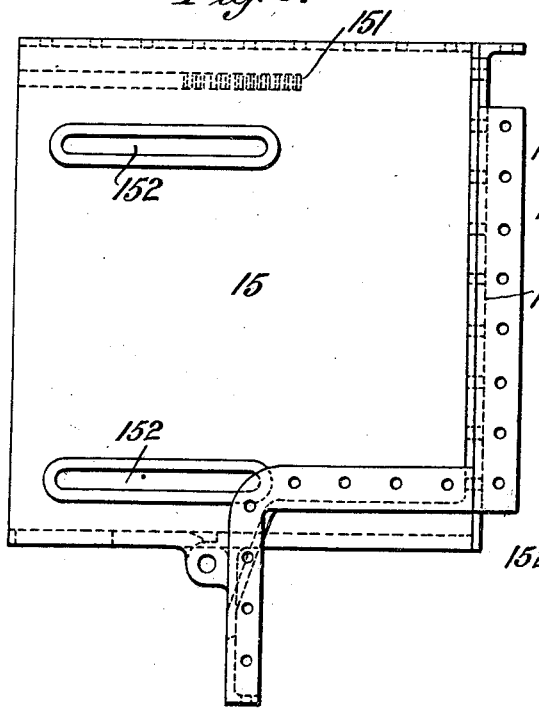
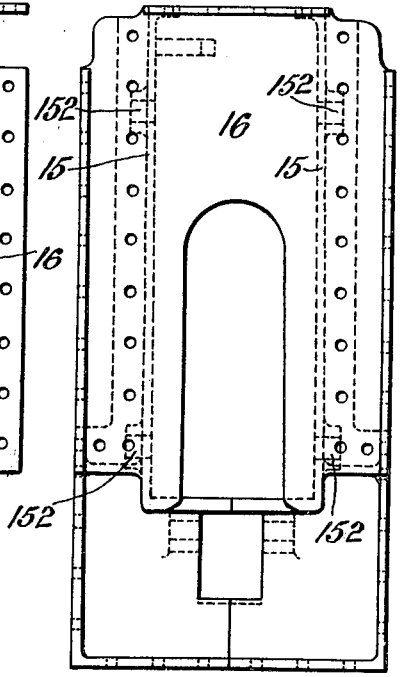

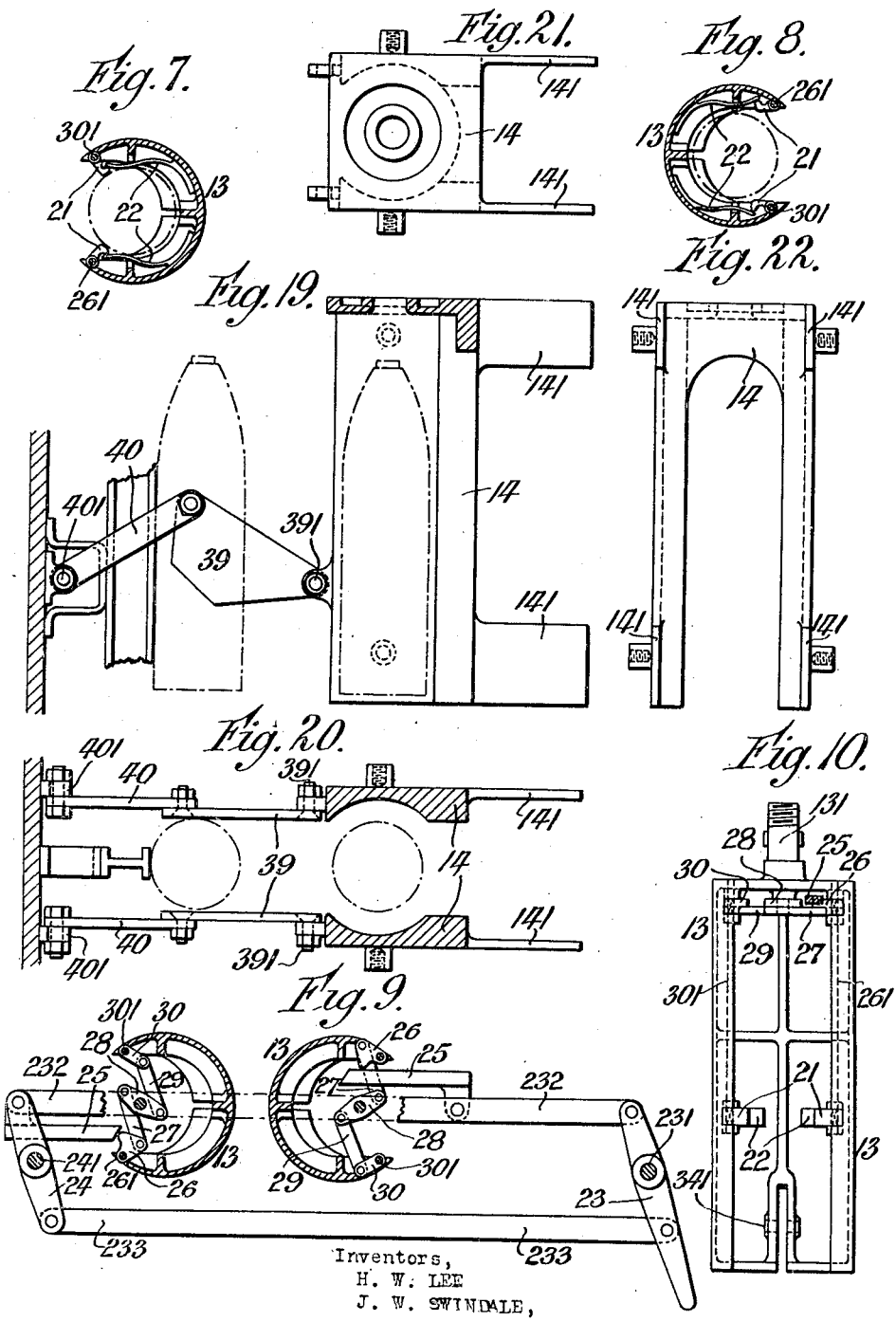

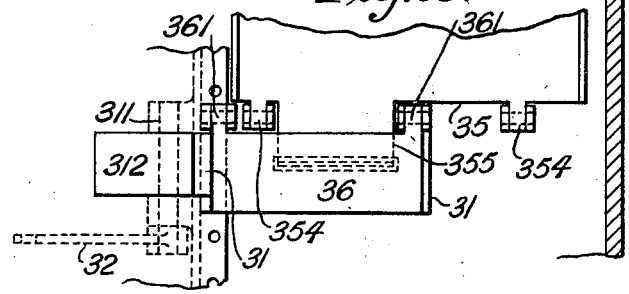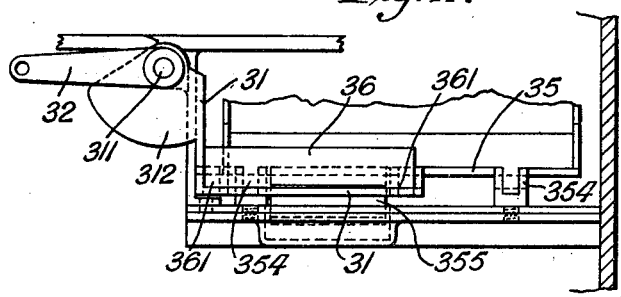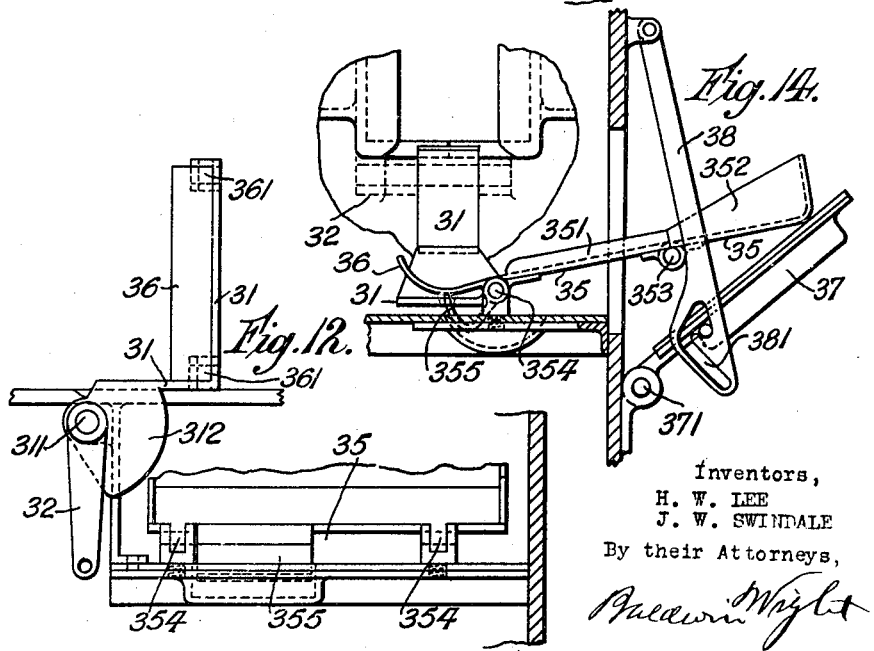

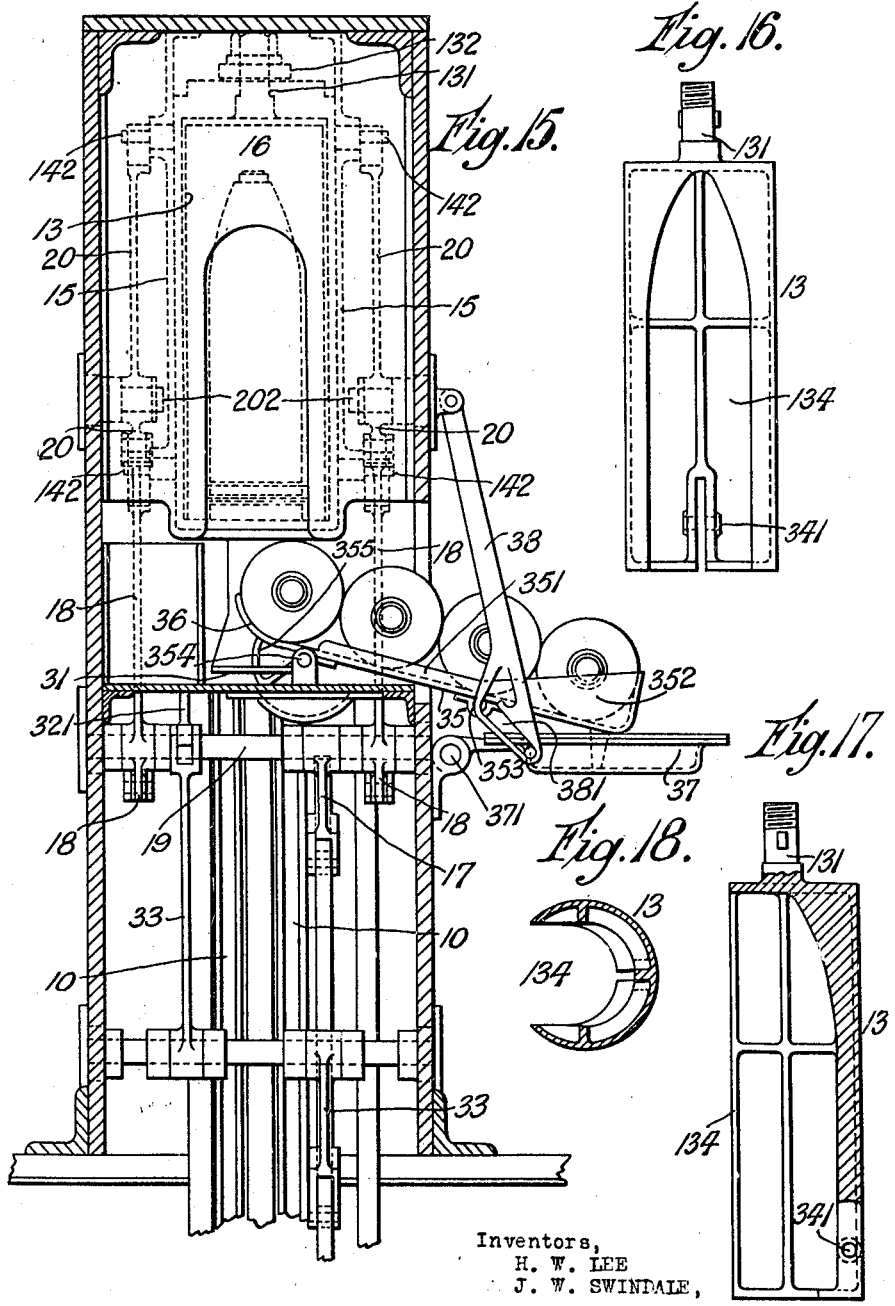

Patented Aug. 28, 1923.

1,465,990

UNITED STATES PATENT OFFICE.

HUGH WARREN LEE AND JOHN WINDLOW SWINDALE, OF NEWCASTLE-UPON-TYNE, ENGLAND, ASSIGNORS TO SIR W. G. ARMSTRONG, WHITWORTH AND COMPANY, LIMITED, OF NEWCASTLE-UPON-TYNE, ENGLAND.

AMMUNITION HOIST ESPECIALLY SUITABLE FOR USE ON BOARD SHIP.

Application filed March 27, 1923. Serial No. 628,047.

*To all whom it may concern:*

Be it known that we, HUGH WARREN LEE and JOHN WINDLOW SWINDALE, both subjects of the King of Great Britain, residing at Elswick Works, Newcastle-upon-Tyne, England, have invented new and useful Improvements in Ammunition Hoists Especially Suitable for Use on Board Ship, of which the following is a specification.

This invention relates to ammunition hoists especially suitable for use on board ship, such as are described in the specifications of the Patents Nos. 143,336, 169,748 and 173,029, in which hoists the ammunition is moved by arms pivoted to sliders.

The objects of this invention are (1) to prevent a flash occurring outside the hoist at its upper end from reaching through the hoist the magazine at its lower end, (2) to prevent a flash occurring inside the hoist from being communicated to the magazine, (3) to prevent a flash occurring outside the hoist at either end from being communicated to the inside of the hoist, and (4) to maintain the hoist flash-tight while the projectile is moved from the horizontal to the vertical position, and vice versa.

These objects are effected by means of a device which is fitted to both ends of the hoist.

According to this invention the device consists of a frame in which a cylinder or casing is rotatably mounted, the cylinder or casing having in its wall and base apertures for allowing the entrance and exit of a projectile. The frame which has apertures in two opposite sides is moved transversely between the vertical plates which form supports and guides for the frame, and which prevent flashes from passing either side of the frame. The frame may be moved transversely by levers actuated by grooves in a cam plate fixed to one of the sliders.

The cylinder or casing may be carried by a trunnion supported on a ball bearing at the upper end of the frame, and on the trunnion is a segmental pinion which engages with a rack when the frame is traversed, whereby the cylinder or casing is turned 180° so that the aperture in the wall of the cylinder is turned to allow of the entrance or exit of a projectile.

In the cylinder or casing are catches which are caused to engage the projectile by means of springs. The catches may be rendered inoperative at either end of the movement of the cylinder or casing by means of fingers which are adjusted to either of two positions according as the ammunition is being supplied or embarked by a lever located near the opening of the hoist.

A tray is pivoted beneath the position assumed by the projectile when the frame has been moved out of the hoist. The tray is turned upon a pivot by means of levers actuated by another groove in the cam plate. When the tray is turned upon its pivot it passes under the base of the projectile, raising it from its support in the cylinder and moves the end of a lever which forces the projectile into the tray.

A receiving (or delivery) tray is hinged to one side of the fixed structure. On the receiving tray is a projection which presses against the lower part of a dished plate hinged to the other tray when it is turned and is nearest its horizontal position, and raises the dished plate so that the projectile rolls out of it into the receiving tray.

The frame may be provided with guides which are pivoted to the frame and to the ends of links pivoted to the hoist, the guides being so mounted that they act as guides for the projectile when the frame is moved outside the hoist but are moved out of action when the frame is again moved back into the hoist.

Figure 2:
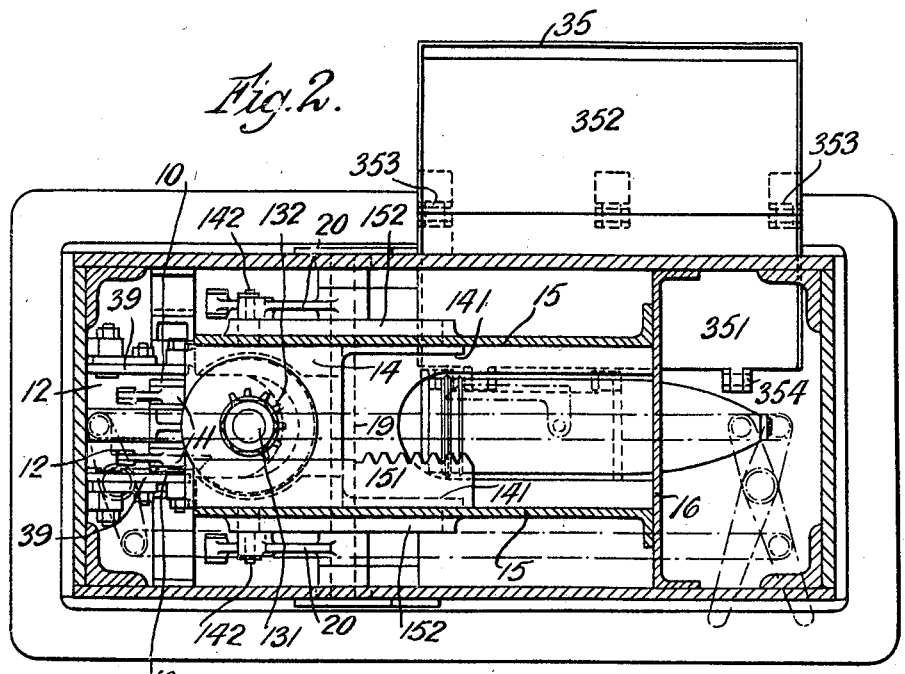
Figure 3:
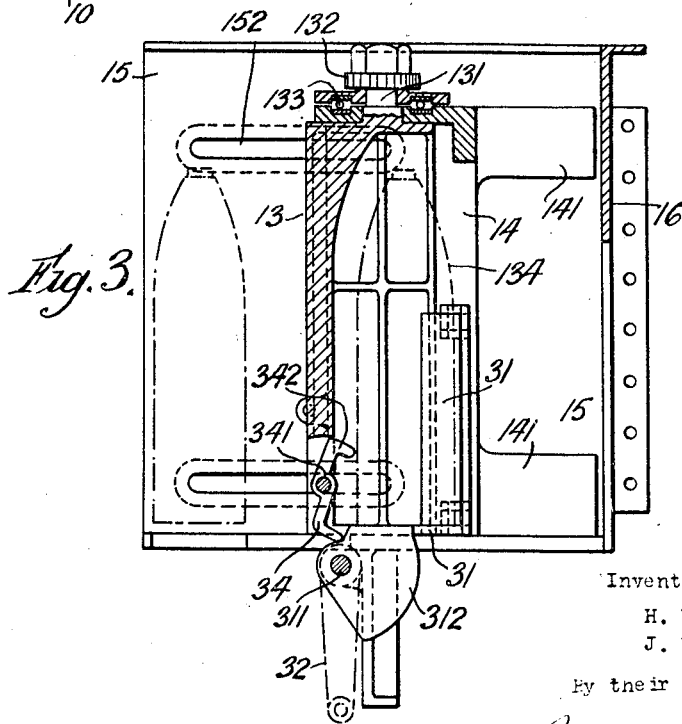

The accompanying drawings illustrate an ammunition hoist made in accordance with this invention. Figure 1 is a vertical section of the top of the hoist, Figure 2 a plan and Figure 3 a view of the upper part of Figure 1 in which the parts are in another position. Figure 4 is a plan, Figure 5 an elevation and Figure 6 an end view showing the details of the plates at the top of the hoist. Figures 7, 8, 9 and 10 show the details of the catches by which the projectile is held in the cylinder and the operation of the same. Figures 11 and 12 are side elevations, Figure 13 a plan of the parts as shown in Figure 11, and Figure 14 a part transverse section of the two trays employed. Figure 11 shows the tray which conveys or receives a projectile into or from the hoist in the same position as shown in Figure 1, and Figure 12 shows it turned through a right angle. Figure 15 is a section taken at right angles to Figure 1. Figure 16 shows an elevation, Figure 17 a vertical section and Figure 18 a horizontal section of the cylinder separately. Figures 19 and 20 are vertical and horizontal sections of the frame showing the guides for the projectile in their position when the frame has been traversed. Figure 21 is a plan of Figure 19 and Figure 22 is an end elevation of the same. To avoid confusion, in Figures 1, 2 and 15 some of the parts are omitted.

The projectiles are raised or lowered in the hoist by sliders 10 to which are pivoted arms 11, the arms 11 being turned on their pivots by means of bars 12 all operating in the manner described in the specifications of our former patents. At the top of the hoist is a cylinder 13 having a shaft 131 on which is a pinion 132 supported by ball bearings 133 on a frame 14. The cylinder has in its wall an aperture 134 and another aperture in its base to allow of the passage of the projectile. The frame 14 is enclosed between side plates 15 and an end plate 16 and on one of the side plates 15 is a rack 151 with which the pinion 132 meshes causing the cylinder 13 to be rotated when the frame 14 is traversed between the plates 15. On the frame 14 are extensions 141 which cover the slots 152 in the plate 15 to prevent flashes passing. The frame is traversed by means of a lever 17 and two bell crank levers 18 all fixed to a shaft 19, the end of the lever 17 entering and being actuated by a cam groove 101 in a cam plate on the slider 10. The short arms of the lever 18 are connected by links 181 to the short arms of other bell crank levers 20, whilst in the long arms of the links 18 and 20 are slots 182 and 201 which engage with pins 142 on the frame. The bell crank levers 20 are pivoted to studs 202. When the lever 17 is actuated the frame 14 moves to the position shown in Figure 3, the cylinder 12 being turned 180° so that the aperture 134 is turned to allow of the entrance or exit of the projectile. In the cylinder 13 are catches 21 (Figures 7, 8 and 10) which are caused to engage the projectile by means of springs 22. A lever 23 is pivoted at 231 and is connected by bars 232 and 233 to another lever 24 pivoted at 241. On the bar 232 are fingers 25 which engage with a plate 26 fast on a spindle 261, to which plate is pivoted one end of a link 27 whose other end is pivoted to one end of a lever 28 whose other end is pivotally connected by a link 29 to an arm 30 fast on a spindle 301. The catches 21 are also fast with one or other of the spindles 261 and 301. When the lever 23 is moved the fingers 25 are moved into the path of the plate 26. The fingers can be adjusted to either of two positions by the lever 23 according as to whether the hoist is being used for supplying or embarking projectiles; the position shown in the drawings is for supplying and is reversed for embarking.

As is shown in Figures 1, 11 and 12, a tray 31 is pivoted at 311 and is turned upon its pivot by means of a lever 32 also fixed to the pivot 311 which lever 32 is connected by a link 321 to one arm of a pivoted lever 33 whose other arm engages with a cam groove 102 in the cam plate on the slider 10. When the tray 31 is turned upon its pivot 311 it passes under the base of the projectile raising it from its support in the cylinder and engages the end of one arm of a lever 34 pivoted to the cylinder at 341, a nose 342 at the end of the other arm engaging the projectile. The movement of the lever 32 causes the lever 34 to be turned upon its pivot forcing the projectile into the tray 31.

Referring more especially to Figures 11 and 15 the projectiles are received from or supplied to the tray 31 by another tray 35 formed in two parts 351 and 352 hinged together at 353 in order to allow the tray to be folded. The tray 35 is pivoted at 354 and has fixed to its underside a curved arm 355. A dished plate 36 is hinged at 361 to the tray 31, the hinges, when the tray 31 is turned down, being in alinement with the pivots 354 as is more especially shown in Figures 11 to 14. When the tray 35 is turned upon its pivot the arm 355 which passes through a hole in the tray 31, as is more especially shown in Figures 13 and 14, turns the plate 36 in a position to receive the projectile from the tray 35 or to raise a projectile from the tray 31 to the tray 35. The outer end of the tray 35 is supported by a watertight door 37 pivoted at 371 so that it can be turned into either of the positions shown in Figures 14 or 15 and held there by the hooked slot 381 in the link 38. In order to prevent the toppling of the projectile when the frame and cylinder have been traversed, guides 39 as shown in Figures 1, 19 and 20 are provided. The guides 39 are pivoted at 391 to the frame 14 and to the ends of the links 40 pivoted at 401 to the hoist. When the frame is in the position shown in Figure 1 the guides are inoperative but come into action when the frame is traversed as shown in Figures 19 and 20. A hoist is provided with similar mechanism at the top and bottom and may be used for supplying ammunition to the magazine or from the magazine to the guns, and it will be seen that when the cylinder 13 is in the position shown in Figure 1 the hoist is protected from flash by reason of the cylinder closing the opening on the right hand side of the frame and when the frame is traversed and assumes the position shown in Figure 3 the aperture on the left hand side is closed by the cylinder 13. The openings are also protected from flash by the side plates 15 and the end plates 16 and filling piece 312 on the tray 31 prevents flashes passing from one side to the other of that part of the plates 15 forming the pivot 311.

In the drawings the upper arm 11 is about to descend whilst the lower arm is ascending and the cam grooves 101 and 102 in the cam plate on the slider 10 are in motion. The end of the lever 17 has just reached the bottom of the short vertical part of the cam groove 101 which part is idle and the lever is about to be operated to reverse the frame 14 and cause the cylinder 13 to rotate when the pinion 132 meshes with the rack 151. When the slider 10 has risen a further distance the end of the lever 33 will have reached the end of the vertical part of the cam groove 102 and will be operated to cause the tray 31 to be turned on its pivot and to raise the projectile from its support in the frame and cause the lever 34 to push the projectile into the tray 31, the catches 21 being released by one of the fingers 25. The slider 10 will then commence to descend causing the tray 31 to be at once turned back again to the horizontal position and when the horizontal part of the groove 101 comes into operation causing the frame 14 to traverse back into the position shown in Figure 1.

What we claim is:—

1. In an ammunition hoist means for conveying ammunition in the hoist, a frame at one end of the hoist, a cylindrical casing located axially with regard to the hoist and rotatably mounted in the frame and means for rotating the casing.

2. In an ammunition hoist means for conveying ammunition in the hoist, a frame at one end of the hoist, means for traversing the frame, a cylindrical casing located axially with regard to the hoist and rotatably mounted in the frame and means for rotating the casing.

3. In an ammunition hoist means for conveying ammunition in the hoist, a movable frame at one end of the hoist, means for traversing the frame, a plate on each side of the frame, a rack on one of the plates, a casing mounted in the frame and a pinion on the casing adapted to engage the rack.

4. In an ammunition hoist a slider for conveying ammunition in the hoist, a frame at one end of the hoist, a casing rotatably mounted in the frame, means for rotating the casing and means actuated by the slider for traversing the frame.

5. In an ammunition hoist a slider for conveying ammunition in the hoist, a frame at one end of the hoist, a plate on each side of the frame, a rack on one of the plates, a casing rotatably mounted in the frame, a pinion on the casing adapted to engage with the rack and means actuated by the slider for traversing the frame.

6. In an ammunition hoist a slider for conveying ammunition in the hoist, a movable frame at one end of the hoist, a casing rotatably mounted in the frame, means for rotating the casing, means for traversing the frame a cam plate on the slider, a lever actuated by the cam plate, other levers fixed to the first lever, bell crank levers engaging the frame and links connecting the second levers to the bell crank levers.

7. In an ammunition hoist a slider for conveying ammunition in the hoist, a frame at one end of the hoist, a plate on each side of the frame, a rack on one of the plates, a casing rotatably mounted in the frame, a pinion on the casing adapted to engage with the rack, a cam plate on the slider, a lever actuated by the cam plate, other levers fixed to the first lever, bell crank levers engaging the frame and links connecting the second levers to the bell crank levers.

8. In an ammunition hoist means for conveying ammunition in the hoist, a frame at one end of the hoist, a casing rotatably mounted in the frame, means for rotating the casing, spring operated catches on the casing and adjustable fingers for releasing the catches.

9. In an ammunition hoist means for conveying ammunition in the hoist, a frame at one end of the hoist, means for traversing the frame, a cylindrical casing rotatably mounted in the frame, means for rotating the casing, spring operated catches on the casing and adjustable fingers for releasing the catches.

10. In an ammunition hoist means for conveying ammunition in the hoist, a frame at one end of the hoist, a casing rotatably mounted in the frame, means for rotating the casing, a pivoted tray adapted to receive or supply projectiles from or to the hoist and means for turning the tray and a lever actuated by the tray and adapted to force a projectile into the tray.

11. In an ammunition hoist means for conveying ammunition in the hoist, a frame at one end of the hoist, means for traversing the frame, a cylindrical casing rotatably mounted in the frame, means for rotating the casing, a pivoted tray adapted to receive or supply projectiles from or to the hoist and means for turning the tray and a lever actuated by the tray and adapted to force a projectile into the tray.

12. In an ammunition hoist means for conveying ammunition in the hoist, a frame at one end of the hoist, means for traversing the frame, a plate on each side of the frame, a rack on one of the plates, a casing mounted in the frame, a pinion on the casing adapted to engage the rack, a pivoted tray adapted to receive or supply projectiles from or to the hoist and means for turning the tray and a lever actuated by the tray and adapted to force a projectile into the tray.

13. In an ammunition hoist a slider for conveying ammunition in the hoist, a frame at one end of the hoist, a casing rotatably mounted in the frame, means for rotating the casing, means actuated by the slider for traversing the frame, a pivoted tray adapted to receive or supply projectiles from or to the hoist, and means actuated by the slider for turning the tray.

14. In an ammunition hoist means for conveying ammunition in the hoist, a frame at one end of the hoist, a casing rotatably mounted in the frame, means for rotating the casing, a pivoted tray adapted to receive or supply projectiles from or to the hoist, a dished plate hinged to the tray, a second tray, a projection on the second tray adapted to engage the dished plate and means for turning the first tray.

15. In an ammunition hoist means for conveying ammunition in the hoist, a frame at one end of the hoist, a cylindrical casing rotatably mounted in the frame, means for rotating the casing, a pivoted tray adapted to receive or supply projectiles from or to the hoist, a dished plate hinged to the tray, a second tray, a projection on the second tray adapted to engage the dished plate and means for turning the first tray.

16. In an ammunition hoist means for conveying ammunition in the hoist, a frame at one end of the hoist, means for traversing the frame, a cylindrical casing rotatably mounted in the frame, means for rotating the casing, a pivoted tray adapted to receive or supply projectiles from or to the hoist, a dished plate hinged to the tray, a second tray, a projection on the second tray adapted to engage the dished plate and means for turning the first tray.

17. In an ammunition hoist means for conveying ammunition in the hoist, a frame at one end of the hoist, means for traversing the frame, a plate on each side of the frame, a rack on one of the plates, a casing rotatably mounted in the frame, a pinion on the casing adapted to engage the rack, a pivoted tray adapted to receive or supply projectiles from or to the hoist, a dished plate hinged to the tray, a second tray, a projection on the second tray adapted to engage the dished plate and means for turning the first tray.

18. In an ammunition hoist a slider for conveying ammunition in the hoist, a frame at one end of the hoist, a casing rotatably mounted in the frame, means for rotating the casing, means actuated by the slider for traversing the frame, a pivoted tray adapted to receive or supply projectiles from or to the hoist, a dished plate hinged to the tray, a second tray, a projection on the second tray adapted to engage the dished plate and means actuated by the slider for turning the first tray.

19. In an ammunition hoist means for conveying ammunition in the hoist, a frame at one end of the hoist, means for traversing the frame, a cylindrical casing rotatably mounted in the frame, means for rotating the casing, links pivoted to the hoist and guides pivoted to the frame and to the links.

20. In an ammunition hoist, means for conveying ammunition in the hoist, a frame at one end of the hoist, apertures in opposite sides of the frame, a casing rotatably mounted in the frame and which maintains closed one or other of the apertures and means for rotating the casing.

21. In an ammunition hoist means for conveying ammunition in the hoist, a frame at one end of the hoist, means for traversing the frame, apertures in opposite sides of the frame, a casing rotatably mounted in the frame and which maintains closed one or other of the apertures and means for rotating the casing.

22. In an ammunition hoist sliders for conveying ammunition in the hoist, frames at both ends of the hoist, apertures in opposite sides of each frame, a casing rotatably mounted in each frame and adapted to maintain closed one or other of the apertures, means for rotating the casing and means actuated by a slider for traversing the frames.

23. In an ammunition hoist means for conveying ammunition in the hoist, frames at each end of the hoist, means for traversing the frames, a casing rotatably mounted in each frame and means for rotating the casings.

In testimony that we claim the foregoing as our invention we have signed our names this 27th day of February 1923.

HUGH WARREN LEE.
JOHN WINDLOW SWINDALE.